US005752082A

United States Patent [19]
Staples

[11] Patent Number: 5,752,082
[45] Date of Patent: May 12, 1998

[54] SYSTEM FOR MULTIPLEXING PINS OF A PC CARD SOCKET AND PC CARD BUS ADAPTER FOR PROVIDING AUDIO COMMUNICATION BETWEEN PC CARD AND COMPUTER SOUND SYSTEM

[75] Inventor: Leven E. Staples, San Antonio, Tex.

[73] Assignee: Data Race, San Antonio, Tex.

[21] Appl. No.: 544,054

[22] Filed: Oct. 17, 1995

Related U.S. Application Data

[63] Continuation-in-part of Ser. No. 496,537, Jun. 29, 1995.

[51] Int. Cl.[6] ............................................. G06F 13/00
[52] U.S. Cl. .................... 395/882; 395/2.09; 395/500; 395/309; 395/311; 370/53; 370/54; 370/79
[58] Field of Search .................. 370/79, 53, 54; 379/94; 381/90; 439/55; 395/2.1, 405, 442, 309, 311, 500, 882, 2.09

[56] References Cited

U.S. PATENT DOCUMENTS

| | | | |
|---|---|---|---|
| 4,578,537 | 3/1986 | Faggin et al. | 379/93 |
| 4,597,077 | 6/1986 | Nelson et al. | 370/60 |
| 4,614,114 | 9/1986 | Sagara et al. | 73/313 |
| 4,679,191 | 7/1987 | Nelson et al. | 370/84 |
| 4,916,607 | 4/1990 | Teraichi et al. | 395/834 |
| 4,972,457 | 11/1990 | O'Sullivan | 379/59 |
| 4,979,144 | 12/1990 | Mizuta | 395/442 |
| 5,136,631 | 8/1992 | Einhorn et al. | 379/67 |
| 5,274,738 | 12/1993 | Daly et al. | 395/2 |
| 5,297,231 | 3/1994 | Miller | 395/2.1 |
| 5,317,630 | 5/1994 | Feinberg et al. | 379/94 |
| 5,333,266 | 7/1994 | Boaz et al. | 395/200.01 |
| 5,335,276 | 8/1994 | Thompson et al. | 380/21 |
| 5,349,640 | 9/1994 | Dunn et al. | 379/387 |
| 5,353,334 | 10/1994 | O'Sullivan | 379/59 |
| 5,361,061 | 11/1994 | Mays et al. | 340/825.44 |
| 5,392,223 | 2/1995 | Caci | 364/514 A |
| 5,408,614 | 4/1995 | Thornton et al. | 395/841 |
| 5,411,405 | 5/1995 | McDaniels et al. | 439/131 |
| 5,423,697 | 6/1995 | MacGregor | 439/638 |
| 5,426,564 | 6/1995 | Hsu | 361/707 |
| 5,428,663 | 6/1995 | Grimes et al. | 379/57 |
| 5,437,019 | 7/1995 | Brockmann | 395/405 |
| 5,440,585 | 8/1995 | Partridge, III | 375/261 |
| 5,444,768 | 8/1995 | Lemaire et al. | 379/68 |
| 5,444,869 | 8/1995 | Stricklin et al. | 455/89 |
| 5,445,525 | 8/1995 | Broadbent et al. | 439/64 |
| 5,457,782 | 10/1995 | Daly et al. | 395/2 |
| 5,463,742 | 10/1995 | Kobayashi | 395/281 |
| 5,471,470 | 11/1995 | Sharma et al. | 370/81 |
| 5,475,691 | 12/1995 | Chapman et al. | 370/110.4 |
| 5,481,616 | 1/1996 | Freadman | 381/90 |
| 5,483,530 | 1/1996 | Davis et al. | 370/79 |
| 5,509,811 | 4/1996 | Homic | 439/55 |

OTHER PUBLICATIONS

John Bryan, "PCMCIA: Past, Present and Promise", Byte, pp. 65–72, Nov. 1994.
Steve Rigney, "Socket to Us: PCMCIA Connectivity", PC Magazine, pp. 207–212, Jan. 24, 1995.
Richard Nass (Nass I), "PCMCIA Fax–Modem and LAN Run Simultaneously", Electronic Design, pp. 131–132, Oct. 3, 1994.
Richard Nass (Nass II), "Multifunction Cards Pose Design Challenges", Electronic Design, pp. 51–53, Oct. 3, 1994.
Don Anderson, "PCMCIA System Architecture", Mindshare, Inc., pp. 1–50, 1994.

*Primary Examiner*—Thomas C. Lee
*Assistant Examiner*—Po C. Huang
*Attorney, Agent, or Firm*—Conley, Rose & Tayon; Jeffrey C. Hood

[57] ABSTRACT

A computer system including a PC Card socket or PCMCIA socket receiving a PC Card, wherein the PC Card socket communicates digital audio information to/from the computer's sound system. The present invention also comprises a PC Card ISDN terminal adapter which is compatible with the PCMCIA specification and which includes telephone answering device and full-duplex speakerphone capabilities. The computer system and PC Card of the present invention utilize one or more pins of the PCMCIA connector for digital audio communication between the computer's sound system and the PC Card. According to the present invention, the PC Card modem uses one or more high address pins to provide digital audio signals between the PC Card and the computer sound system.

31 Claims, 6 Drawing Sheets

SYSTEM FOR MULTIPLEXING PINS OF A PC CARD SOCKET AND PC CARD BUS ADAPTER FOR PROVIDING AUDIO COMMUNICATION BETWEEN PC CARD AND COMPUTER SOUND SYSTEM

CONTINUATION DATA

This is a continuation-in-part of U.S. patent application Ser. No. 08/496,537 titled "Computer System Which Provides Analog Audio Communication Between a PC Card and the Computer's Sound System" filed on Jun. 29, 1995, still pending whose inventor is Leven E. Staples, and which was assigned to Data Race Corporation.

FIELD OF THE INVENTION

The present invention relates to a computer system including digital audio communication between a sound system and a PC Card slot, wherein the computer system is adapted to receive a PC Card adapted for insertion into the PC Card slot which interfaces to the computer's sound system, and wherein the PC Card communicates digital audio data with a codec or sound system inside the computer system.

DESCRIPTION OF THE RELATED ART

PC Cards were introduced in 1989 under the name "PCMCIA cards" according to a standard developed by the Personal Computer Memory Card International Association (PCMCIA). In 1995 the PCMCIA committee renamed the cards to "PC Cards." The principal benefit of the PC Card standard has generally been portability. The PCMCIA (Personal Computer Memory Card International Association) standard was originally developed for plug-in memory cards for portable and laptop computer systems. However, the PCMCIA standard has grown to encompass a broad array of peripheral devices, including network adapters, modems, flash memory cards, sound cards, global positioning system devices, and others.

The PCMCIA standard is not sanctioned by an official standard's body such as the IEEE (Institute of Electrical and Electronics Engineers) or ANSI (American National Standards Institute), but rather the PCMCIA specification is promulgated by the PCMCIA committee, which provides a series of recommended guidelines for the physical specification of cards, the physical and electrical specification of sockets and the interaction among system software and cards.

The PCMCIA standard requires that all PC Cards have the same length and width, this being 85.6 mm by 54 mm. The PCMCIA standard currently defines three types of PC Cards. Type I cards are limited to a thickness of 3.3 mm and are used principally as memory cards, including RAM cards, ROM cards and DRAM cards. Type II PC Cards can be up to 5.5 mm thick and are large enough to include I/O port connections, and thus most LAN (local area network) adapters and modems are type II PC Cards. Type III cards can be up to 10.5 mm thick and are typically used for products that require moving parts such as hard disks. PCMCIA PC Card slots are backwards compatible with regard to size, i.e., a type III slot also accepts type I and type II cards, but a type I slot will only receive type I cards.

The physical and electrical standards for PC Cards have evolved over time. The original PCMCIA 1.0 standard defined only type I Cards and did not define an I/O feature or software drivers. The PCMCIA 2.0 standard introduced I/O-specific cards, but did not define software driver specifications. Rather, software driver specifications were left to card manufacturers. The PCMCIA 2.1 standard introduced the use of software drivers called Card Services and Socket Services. These software driver standards helped solve many compatibility problems users experienced between different cards and slots. The PCMCIA 2.1 standard also introduced plug-and-play features such as the ability to hot swap cards without rebooting the PC.

The most recent PCMCIA PC Card standard is referred to by the PCMCIA Committee simply as the "PC Card standard" and does not include a version number. This standard includes new specifications for 32 bit bus mastering adapters, on board direct memory access (DMA), multi-function adapters, and reduced power requirements of 3.3 volts.

The PCMCIA specification also governs the driver software specification referred to as card and socket services, which determine how the cards operate. The socket services are a set of BIOS-level drivers that control the physical operation of PCMCIA sockets. Card services also coordinate the system interrupts and memory activities and handle power management tasks.

The PCMCIA standard also requires that each card connect in a PC Card adapter slot using a standard 68 pin connector. For PC Card memory devices, the pins are used primarily for address and data lines, as well as a few control lines. PC Cards configured as input/output (I/O) devices, such as a modem, network adapter, or sound card, define additional signals, including a digital speaker signal referred to as SPKR (pin 62), which provides digital audio signals to the computer system.

Computer systems are currently evolving into multimedia systems which have advanced graphics and sound capabilities. Another trend in the computer industry is the marriage of computers with telephones to create computer telephony applications. Thus a computer system may include a telephone which interfaces to a telephone line, or the computer system may implement a virtual telephone on the display screen using the computer's microphone for audio input and the computer's speaker for audio output.

One problem with the PCMCIA specification is that the specification does not allow a PCMCIA PC Card, such as a PC Card modem, to effectively communicate digital audio information directly with a computer's sound system. As noted above, the PCMCIA specification includes a digital speaker signal referred to as SPKR which provides a digital audio signal to the computer system. However, this digital speaker signal is insufficient for modern digital audio communication applications. Thus, the current PCMCIA specification does not allow for PCMCIA standard cards which support advanced digital voice or telephony applications.

Therefore, a new computer system and PCMCIA PC Card is desired which adheres to the existing PCMCIA standard and is thus backwards compatible with existing devices, and which also facilitates digital audio communication between the computer's sound system and the PC Card. This would allow a PC Card modem or terminal adapter to include or perform advanced digital audio and telephony capabilities.

SUMMARY OF THE INVENTION

The present invention comprises a computer system including a PC Card socket, also referred to as a PCMCIA socket, for receiving a PC Card, wherein the computer system provides digital audio communication between the computer's sound system and the PC Card. The present invention also comprises a PC Card modem or ISDN terminal adapter which is compatible with the PCMCIA specification and which includes telephone answering device and full-duplex speakerphone capabilities.

The computer system and PC Card of the present invention utilize one or more pins of the PC Card connector for digital audio communication between the computer's sound system and the PC Card. In the preferred embodiment, the computer system multiplexes digital audio signals on high address lines for digital audio communication. Other embodiments use different pins, as desired.

According to the preferred embodiment of the present invention, the PC Card uses the various pins according to the PCMCIA standard configuration when the PC Card does not require digital audio communication. However, when the PC Card is configured in a digital audio mode to transmit or receive digital audio data to or from a sound system or codec inside the computer system, the PCMCIA connector of the present invention preferably multiplexes the digital audio data on one or more pins, preferably the high address pins. The card and socket software, which operates the PC Card, preferably controls the multiplexer comprised in the PCMCIA connector to select the digital audio function when desired.

In the preferred embodiment, the computer system selectively routes the signals between the PC Card and the normal inputs of the PCMCIA controller chip or between the PC Card and inputs of a codec comprised in the sound system. The digital audio signal paths to the codec are preferably disabled by the PCMCIA controller chip under normal operation, and the high order address lines to the controller chip are preferably disabled when digital audio communication is being performed. In the preferred embodiment, one or more high address pins are used for transmission of digital audio data from the PC Card to the codec, and one or more high address pins are used for transmission of digital audio data from the computer system codec to the PC Card. Therefore, the present invention provides a computer system having a PC Card socket conforming to the PCMCIA specification which includes digital audio communication between the computer's sound system and the PC Card socket. The present invention further includes a PCMCIA standard modem or ISDN terminal adapter which includes digital audio communication capabilities with a computer system. The present invention requires little additional cost or changes to current computer systems.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference *PCMCIA System Architecture* by Don Anderson and available from Mindshare Press, 2202 Buttercup Dr., Richardson, Tex. 75082 (214) 231-2216, is hereby incorporated by reference in its entirety.

The PCMCIA specification, including version 2.1 as well as other versions, is hereby incorporated by reference in its entirety.

U.S. patent application Ser. No. 08/496,537 titled "Computer System Which Provides Analog Audio Communication Between a PC Card and the Computer's Sound System" filed on Jun. 29, 1995, whose inventor is Leven E. Staples, is hereby incorporated by reference in its entirety.

Computer System

Figure 1:
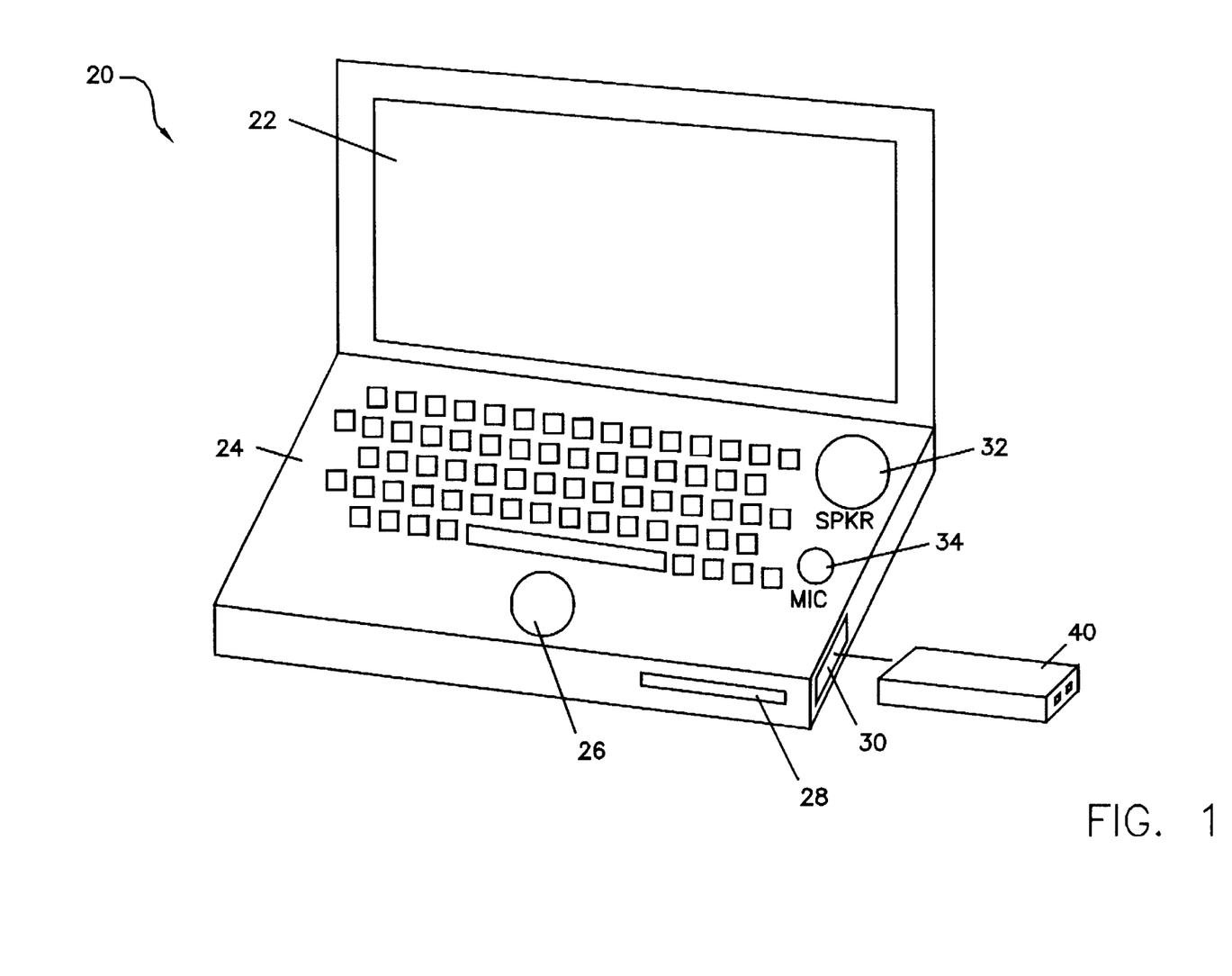
FIG. 1 illustrates a portable computer system including a PC Card Socket for receiving a PC Card according to the present invention.

Referring now to FIG. 1, a portable computer system 20 is shown which includes a PC Card socket 30, also referred to as a PCMCIA (Personal Computer Memory Card International Association) socket. The computer system 20 also includes a sound system (FIG. 6), preferably including a an audio digital coder/decoder (codec). The computer system 20 of FIG. 1 includes digital audio communication between the PC Card socket 30 and the sound system according to the present invention. Thus, the computer system is adapted for receiving a PCMCIA modem or ISDN (Integrated Services Digital Network) terminal adapter having digital audio capabilities according to the present invention. The system and method of the present invention can be incorporated into various types of computer systems which include PC Card slots, including the portable system 20 shown in FIG. 1, desk top units, and mini-tower units, as well as others.

As shown, the computer system 20 preferably includes a display screen 22, keyboard 24, mouse 26, and floppy drive 28. The computer system 20 includes components generally found in all computer systems, including a CPU, system memory, one or more buses, and various peripheral controllers and devices. The computer system 20 includes a sound system including a codec (not shown), as well as a microphone 34 and one or more speakers 32. The microphone 34 preferably includes an amplifier. In the present disclosure, the term sound system includes logic which transmits, processes, and/or stores audio signals, including one or more of a microphone, speakers, sound logic, codecs, and other audio signal processing logic.

The computer system 20 also includes a PCMCIA host bus adapter (FIG. 2) and corresponding one or more PC Card sockets or slots 30 for receiving one or more removable PC Cards 40 as shown. According to the present invention, one or more of the PC Card sockets 30 and the sound system are connected to allow digital audio communication, i.e., the transfer of digital audio data, between the sound system and the PC Card socket 30. In the present disclosure, digital audio data preferably refers to a digitally coded representation of analog signals. However, the present invention allows various types of audio signal communication between the sound system and the PC Card socket 30.

Figure 5:
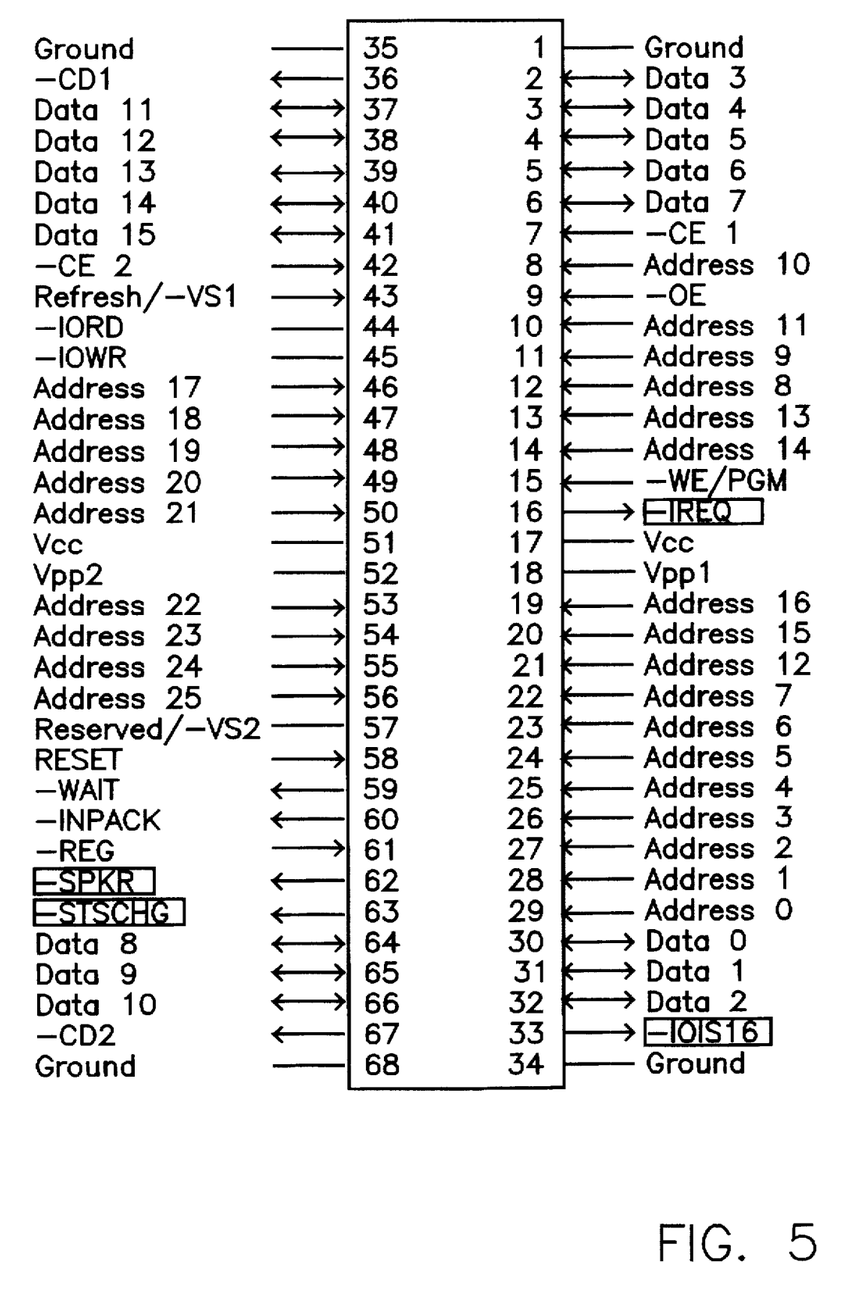
FIG. 5 illustrates pin definitions of the PC Card socket or PCMCIA I/O socket.

In the preferred embodiment the PC Card socket 30 is preferably compatible with the PCMCIA (Personal Computer Memory Card International Association) electrical specification, and includes additional signal definitions which allow digital audio communication between the computer's sound system and the PC Card 40. The pin definition of the PC Card socket is shown in FIG. 5. Thus the present invention allows operation of a PC Card modem or terminal adapter with telephone answering device (TAD) and full duplex speakerphone (FDSP) capabilities.

Figure 2:
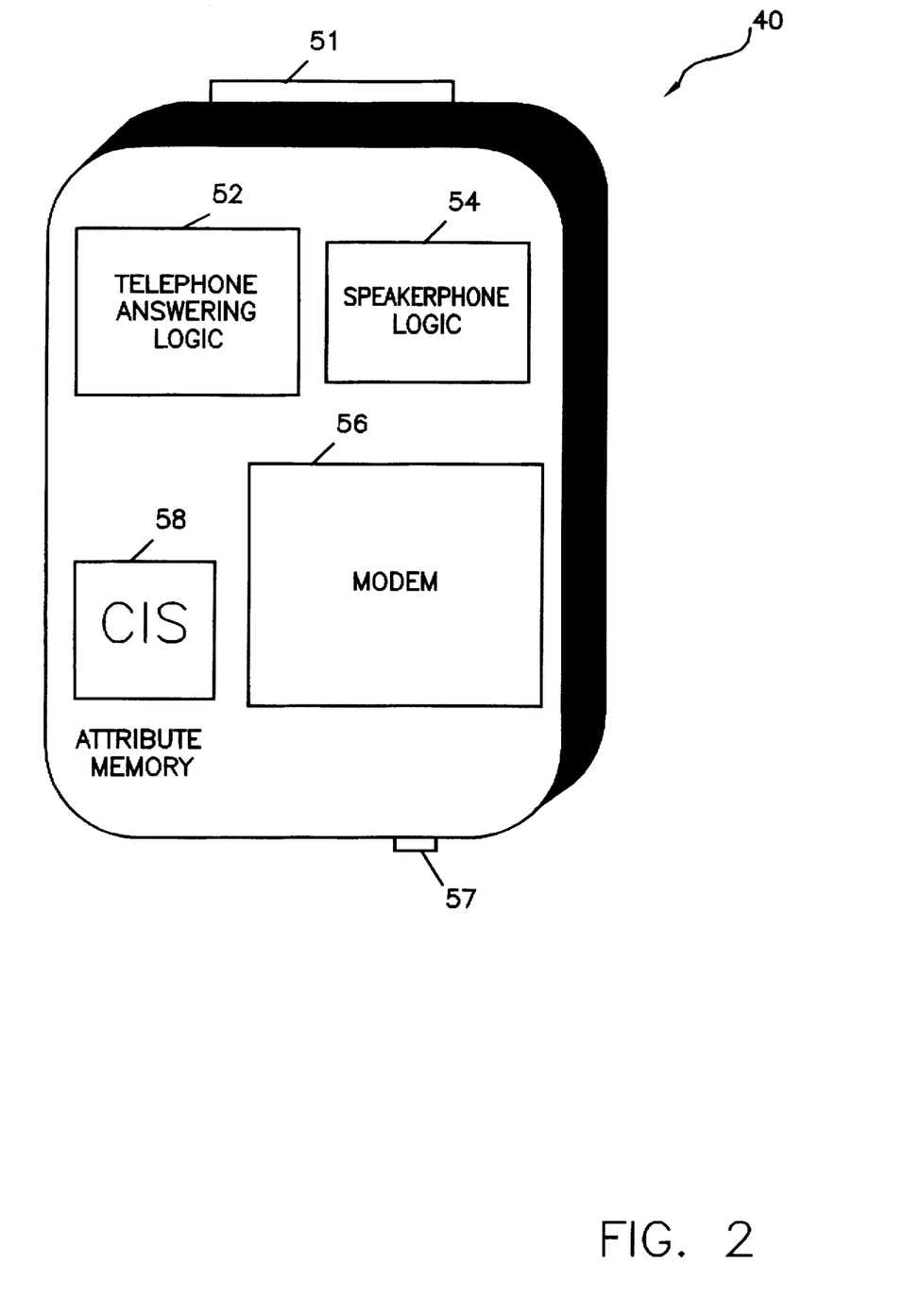
FIG. 2 illustrates a PC Card which is adapted to be inserted into the PC Card socket of FIG. 1.

The PC Card 40 preferably comprises an analog modem or ISDN terminal adapter having telephone answering device and/or full duplex speakerphone capabilities according to the present invention. As shown, the PC Card 40 is adapted for insertion into the PC Card socket or PCMCIA socket 30 in the computer system 20. The PC Card 40 is inserted into the PC Card slot 30 and can communicate digital audio signals with the computer's sound system. This enables the PC Card 40 to use the computer's sound system. Thus the PC Card 40 can provide telephone answering device (TAD) and full duplex speakerphone (FDSP) capabilities by using the computer's sound system. The PC Card 40 can also use the computer's sound system to perform digital simultaneous voice and data (DSVD) communications. The PC Card 40 may comprise other functionality which performs digital audio communication with the computer system 20.

PC Card Block Diagram—FIG. 2

Referring now to FIG. 2, the PC Card 40 of the preferred embodiment is shown. The PC Card 40 of the preferred embodiment includes telephone answering device and speakerphone capabilities according to the present invention. As shown, the PC Card terminal adapter 40 includes either a modem or an ISDN terminal adapter. In the present disclosure, the term "modem" is intended to refer generally to a communication device, including an analog modem and an ISDN terminal adapter, among others. In the preferred embodiment, the PC Card 40 includes modem 56 which includes a connector 57 that preferably interfaces to a communication path, preferably a phone line. The PC Card modem 40 also includes telephone answering logic 52 which performs telephone answering device functions and speakerphone logic 54 which preferably performs full-duplex speakerphone functions. The PC Card 40 also includes card information structure memory which contains configuration options for the PC Card. The CIS memory 58 preferably contains information about the type, size, speed, and other information regarding the PC Card 40.

The PC Card 40 includes an adapter 51 which is adapted for mating with the PC Card socket 30. The adapter 51 includes a plurality of connectors which mate with corresponding ones of the plurality of pins comprised in the PC Card socket. In the preferred embodiment the PC Card 40 is preferably compatible with the PCMCIA (Personal Computer Memory Card International Association) electrical specification, and includes additional signal definitions which allow the PC Card 40 to perform digital audio communication with the computer system 20. This enables the PC Card 40 to operate with telephone answering device (TAD) and full duplex speakerphone (FDSP) capabilities. The PC Card 40 is also mechanically compatible with the PCMCIA specification. In alternate embodiments, the PC Card is electrically and/or mechanically compatible with JEDEC (Joint Electronic Device Engineering Council) standards and/or JEIDA (Japanese Electronics Development Association) standards, among others.

When the PC Card 40 receives a telephone call via the modem or terminal adapter 56, the telephone answering logic 52 receives the digital voice signals and either stores the voice data within memory within the PC Card 40, or the PC Card 40 provides digital (or analog) audio output signals to the computer system, as discussed further below. Also, when a user desires to listen to one or more telephone messages, if the telephone answering logic 52 stores the voice data in a memory within the PC Card 40, the telephone answering logic 52 provides digital audio output signals corresponding to the recorded voice message to the computer system for audio presentation by the computer speakers 32.

When the user desires to use the computer system 20 as a speakerphone, the user speaks into the microphone 34 and these signals are provided to the codec and then to the PC Card 40, i.e., the speakerphone logic 54 and terminal adapter 56, out to the communication path, preferably a phone line. Also, digital audio signals received by the terminal adapter or modem 56 are provided through the speakerphone logic 54 to the codec in the sound system of the computer system 20, and ultimately to the one or more speakers 32 of the computer system 20.

Therefore, the PC Card modem or terminal adapter 40 includes telephone answering device and full duplex speakerphone capabilities according to the present invention. In addition, the PC Card or PCMCIA card 40 of the present invention allows the computer's internal sound system to provide audio for digital simultaneous voice-data (DSVD).

Figure 3:
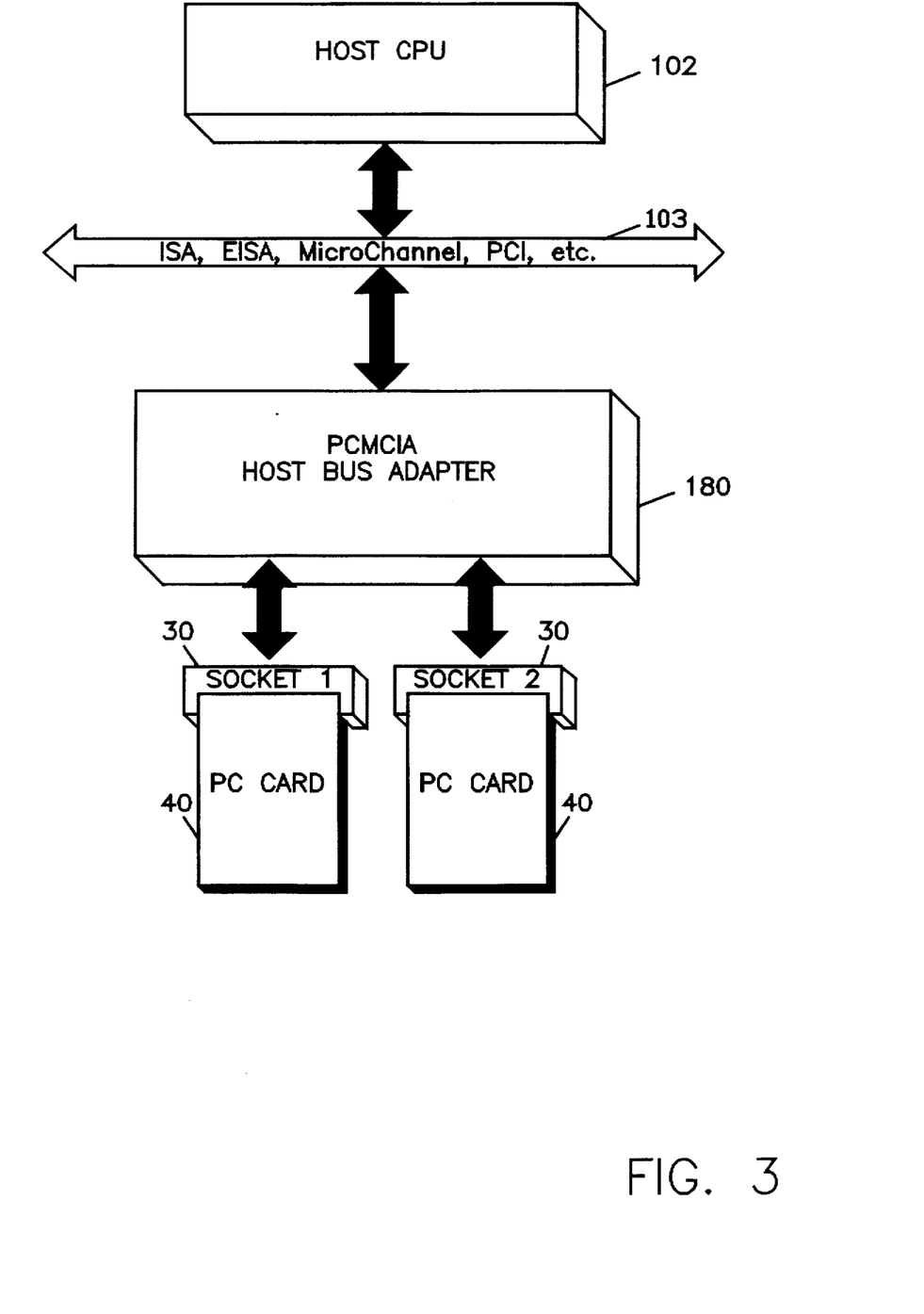
FIG. 3 is a block diagram illustrating the host CPU and PCMCIA host bus adapter architecture of the computer system of FIG. 1.
Figure 4:
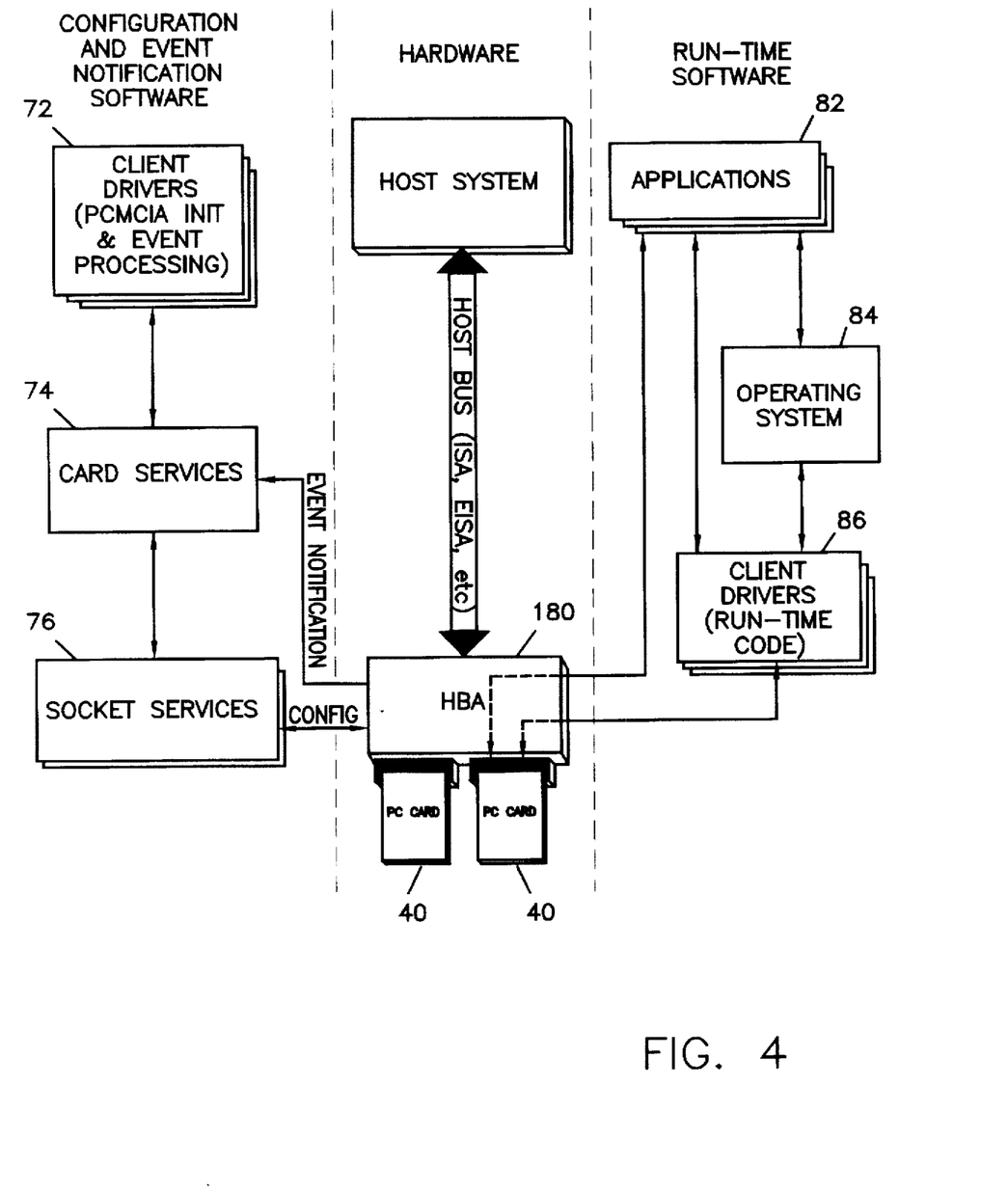
FIG. 4 illustrates hardware and software components in the computer system of FIG. 1 which interface to a PC Card.

Computer System Block Diagram—FIGS. 3–4

Referring now to FIG. 3, a block diagram illustrating the architecture of a computer system which includes one or more PC Card sockets is shown. As shown, the computer system 20 includes a host CPU 102 which interfaces to one or more expansion buses 103 within the computer system. A PCMCIA host bus adapter 180, also referred to as a PC Card bus adapter, is coupled to the one or more expansion buses 103.

The PCMCIA specification is essentially a bridge bus technology, meaning that a PC Card socket 30 developed according to the PCMCIA specification can be coupled to any number of buses or platforms. Thus the PCMCIA host bus adapter 180 can be coupled to any of various buses, including the Industry Standard Architecture (ISA) or AT expansion bus, the Extended Industry Standard Architecture (EISA) bus, the MicroChannel (MCA) bus, the PCI (peripheral component interconnect) bus, and NuBus among others.

The PCMCIA host bus adapter 180 includes the PCMCIA controller logic which interfaces between the expansion bus 103 of the computer system 20 and the removable PC Card 40. As shown, the PCMCIA host bus adapter 180 interfaces to one or more PC Card sockets 30 which are adapted for receiving PC Cards 40 as shown.

Referring now to FIG. 4, a more detailed block diagram illustrating the hardware and software components of the computer system 20 is shown. As shown, a computer system which includes a PC Card socket or PCMCIA socket 30 includes configuration software referred to as client drivers 72 which detect the presence of PC Cards 40, determine their configuration requirements, and program the PC Cards 40 for operation within the system. The PCMCIA specification includes an additional layer referred to as Card Services 74 which provide high level functions used by programmers to gain access to the PC Card 40 to determine its configuration requirements and also to request system resources. Card Services 74 perform system resource allocation for client drivers and maintain a data base in system resources that are available for assignment to PC Cards. Socket Services 76 comprise a set of BIOS-level drivers which handle the physical operations of the PC Card socket.

As shown in FIG. 4, application software executing on the host system operates in conjunction with operating system software 84 and client drivers 86 which interface to the host bus adapter 180. In the preferred embodiment of the invention, the applications software 82 includes software which facilitates the PC Card modem or terminal adapter 40 having telephone answering device and/or full duplex speakerphone capabilities.

PC Card Socket Specification

Referring now to FIG. 5, a diagram illustrating the PCMCIA specification I/O socket 30 is shown. FIG. 5 illustrates the pin definitions or signals for the PC Card socket 30 which conform to the PCMCIA specification. As shown, the PC Card socket 30 includes a plurality of address and data pins, as well as various control pins. The address pins are referred to as Address 0–Address 25.

In the preferred embodiment of the invention, the high address line pins, preferably one or more of address lines 22–25, corresponding to pins 53–56, are used to provide digital audio communication between the PC Card 40 and the sound system in the computer system 20. The PCMCIA connector 180 preferably multiplexes the digital audio signals on the high address line pins with the normal high address signals. Alternate embodiments may use various different pins to communicate the digital audio data, as desired.

Figure 6:
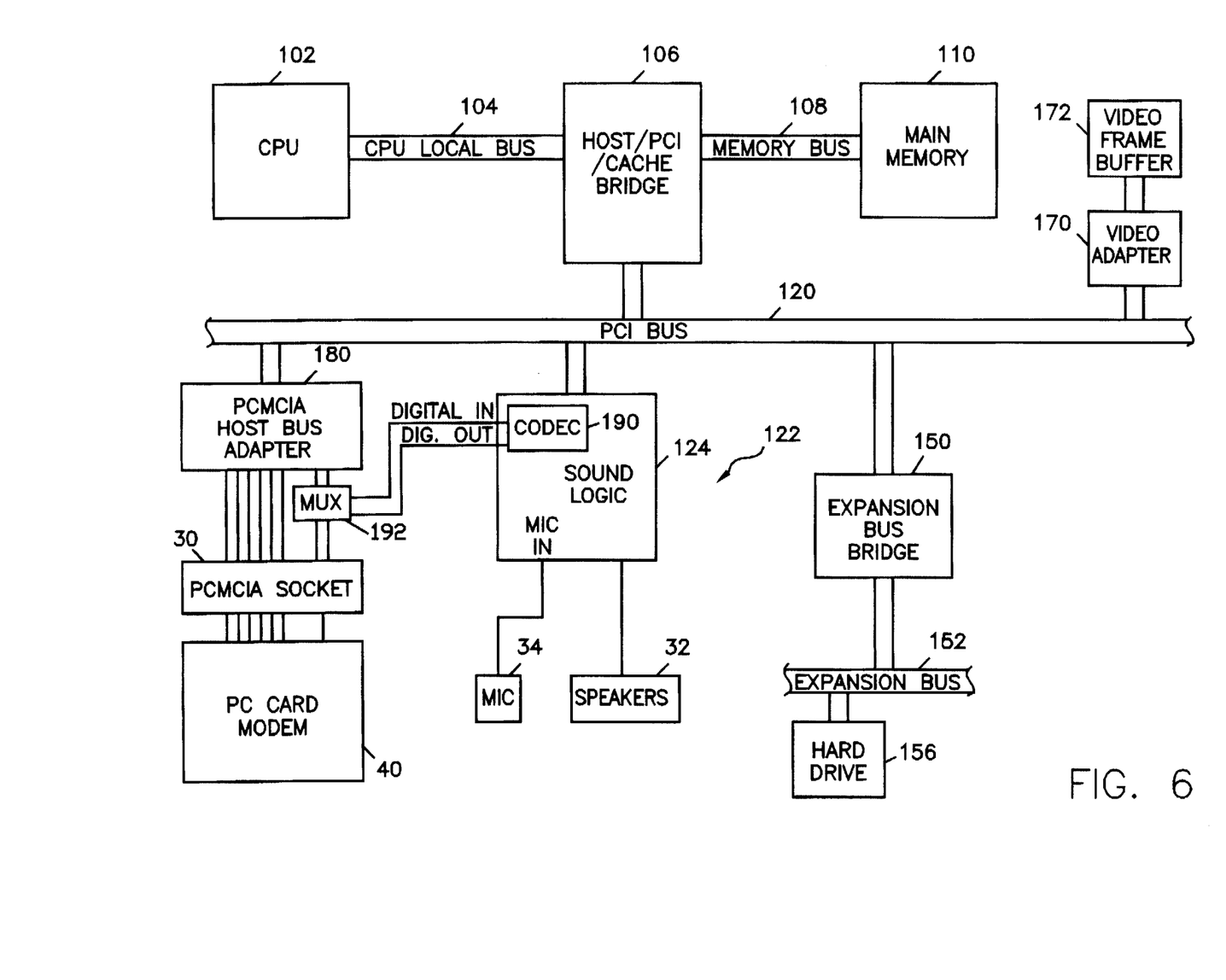
FIG. 6 is a more detailed block diagram of the computer system of FIG. 1 illustrating an embodiment which provides digital audio signal communication between the PC Card socket and the computer's sound system.

Computer System Block Diagram—FIG. 6

Referring now to FIG. 6, a block diagram is shown of microcomputer system 20 incorporating improved digital audio communication between the computer's sound system and the PC Card socket 30 according to the present invention. In the preferred embodiment of the invention, the PCMCIA host bus adapter 180 is a PCI bus adapter coupled to the PCI bus. However, it is noted that the PC Card slot may be coupled to any of various types of expansion buses as noted above. Also, the computer system of FIG. 6 is illustrative only, and the present invention may be incorporated into various other systems having various configurations or architectures, as desired.

The embodiment shown in FIG. 6 provides bi-directional communication for digital audio signals between the PC Card 40 and the sound system 122 of the computer system 20. This allows PC Cards which correspond to the PCMCIA electrical specification to include advanced telephony functions, such as telephone answering device functions and full-duplex speakerphone capabilities. It is noted that the present invention may be used to provide bi-directional communication for digital or analog signals, as desired.

As shown, the computer system 20 includes a central processing unit (CPU) 102 which is coupled through a CPU local bus 104 to a host/PCI/cache bridge or chipset 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other buses may be used.

Various types of devices may be connected to the PCI bus 120, including one or more PC Card bus adapters 180, as desired. In the embodiment shown in FIG. 1, a video adapter 170 and video frame buffer 172 are coupled to the PCI bus 120 for controlling video functions.

A sound system 122 is preferably coupled to the PCI bus 120. The sound system 122 preferably includes sound logic 124, microphone 34 and speakers 32. The sound logic 124 includes a codec 190 (audio digital coder/decoder), which may also be referred to as a vocoder (voice coder/decoder), which performs analog to digital (A/D) and digital to analog (D/A) functions. The codec 190 may also perform audio compression or decompression functions. The sound logic 124 may also include amplification logic, as well as other logic. In the preferred embodiment, the sound logic 124 includes advanced sound functionality, such as SoundBlaster or SoundBlaster-compatible circuitry, which includes codec or vocoder functionality 190. The sound logic 124 may also include sound functions such as MIDI and wavetable synthesis, among others. As shown, the speakers 32 are coupled to an output of the sound logic 124. Also, in the embodiment of FIG. 6, the microphone 34 is coupled to a microphone input of the sound logic 124.

A PC Card bus adapter 180, also referred to as a PCMCIA bus adapter, is coupled to the PCI bus 120. For more information on an embodiment of PC Card bus adapter 180, please see "PCMCIA System Architecture", referenced above, which is hereby incorporated by reference. PCMCIA socket 30 is connected to the PC Card bus adapter 180. The bus adapter 180 includes logic according to the present invention which interfaces between PC Card 40 and the respective expansion bus 120. Various other devices may be connected to the PCI bus 120, as desired.

Expansion bus bridge logic 150 may be coupled to the PCI bus 120. The expansion bus bridge logic 150 interfaces to an expansion bus 152. The expansion bus 150 may be any of varying types, including the industry standard architecture (ISA) bus, also referred to as the AT bus, the extended industry standard architecture (EISA) bus, or the Micro-Channel architecture (MCA) bus. Various devices may be coupled to the expansion bus 152, including a hard drive 156. It is noted that one or more of the sound system 120 or the PC Card bus adapter 180 may be coupled to the expansion bus 152.

Digital Audio Communication Logic

Referring again to FIG. 6, in the preferred embodiment of the present invention the system includes one or more multiplexers, referred to as multiplexer 192, coupled between one or more pins in the PC Card socket 30 and the sound system 122. In the preferred implementation of this embodiment, the high address line pins of the PC Card socket 30 are used for digital audio signal communication between the PC Card 40 and sound system 122. These embodiments preferably use one or more high address pins, such as address pins 22–25, for digital audio communication. Other address pins, or other pins shown in the pinout of FIG. 5, may be used as desired.

The embodiment of FIG. 6 includes the multiplexer 192 connected to the high address pins of the PC Card socket 30. The multiplexer 192 is also coupled to the PC Card bus adapter 180 and to the sound system 122 as shown. The multiplexer 192 selects either a first path between the one or more high address pins and the PC Card bus adapter 180 or a second path between the one or more high address pins and the sound system 122. In the preferred embodiment, the multiplexer 192 is initially configured to select the first path between the one or more high address pins and the PC Card bus adapter 180. When the PC Card 40 is inserted into the PC Card socket 30, the multiplexer 190 can select the second path between the one or more high address pins and the sound system 122 to provide digital audio communication between the PC Card 40 and the sound system 122.

A means is preferably provided which controls the multiplexer 192 and selects either the first path or the second path. In the preferred embodiment, the means which controls the multiplexer 192 is software which operates the PC Card 40, such as the client drivers 86, or applications software 82, or even the operating system 84. Alternatively, the software which controls the multiplexer 192 is either the client drivers 72, the Card Services 74, or the Socket Services 76. Software can control operation of the multiplexer 192, for example, by writing a bit to a register in the sound logic 124, wherein the register in the sound logic 124 provides a select signal to a select input of the multiplexer 192. Hardware means in the sound system 122 or in other parts of the computer system 20 may also be used to control the multiplexer 192, as desired.

Thus, one or more pins of the PC Card socket 30, preferably one or more high address pins, are connected through respective multiplexers 192 to digital audio inputs and outputs of the sound logic 124. Thus the PC Card modem or terminal adapter 40 generates one or more digital (or analog) audio signals that are provided through one or more of the high address pins of the PC Card socket 30 and through respective multiplexers 192 to the sound logic 124. Also, the sound logic 124 generates one or more digital audio signals that are provided through the respective multiplexers 192 to one or more of the high address pins of the PC Card socket 30 and then to the PC Card 40. It is noted that FIG. 6 only illustrates one digital in signal and one digital out signal to the sound logic 124. However, the computer system may include one or more digital in signals and one or more digital out signals between the PCMCIA socket 30 and the sound logic 124.

In the embodiment of FIG. 6, the microphone 34 is connected to a microphone input of the sound logic 124. As noted above, the microphone 34 preferably includes an amplifier. When a user speaks into the microphone 34, the sound is provided to the microphone input of the sound logic 124 and is received by the codec 190. If the computer system 20 is configured so that the microphone input is to be provided to the PC Card 40, then corresponding digital audio signals are provided from the codec 190 to the PC Card modem or terminal adapter 40.

Digital audio signals from the PC Card 40 are provided through the multiplexer 192 to one or more digital audio inputs of the sound logic 124. These digital audio signals are then provided through the sound logic 124, with any desired processing performed on the signal. For example, the codec 190 may receive the digital audio signals, convert them to analog format, and provide the resulting analog signals as output signals to the speakers 32. Therefore, the speakers 32 generate sound in response to the digital audio signals generated by the PC Card 40. The digital audio signals from the PC Card 40 may also be processed in the sound logic 124 and/or provided to other parts of the computer system. For example, the digital audio signals may be stored in a memory of the computer system.

The sound logic 124 also preferably provides one or more digital audio outputs to the PC Card 40. Thus, when the PC Card 40 is used as a full-duplex speakerphone, and when the user of the computer system is talking to a person at a remote location, the voice signals from the user are provided through the microphone 130 and codec 190 and through the mux 192 and high address pins of the socket 30 to the PC Card modem or terminal adapter 40 and out through a telephone line to the respective person. It is also noted that the sound logic 124 may multiplex a plurality of digital audio outputs to the PC Card 40. If the user of the computer system desires to place the person on hold and then play music or other audio signals during the time that the person is on hold, software executing on the CPU 102 switches the digital audio output from the sound logic 124, or switches a multiplexer within the sound logic 124, to provide appropriate sound signals from the sound logic 124 to the PC Card modem 40 and then to the person on hold.

Conclusion

Therefore, a computer system which includes a PC Card socket and which provides bi-directional digital audio signal communication between the PC Card socket and the sound system of the computer system is shown and described. The computer system of the present invention thus allows a PC Card modem or ISDN terminal adapter with advanced audio and/or telephony capabilities, such as telephone answering device capabilities, full-duplex speakerphone capabilities, or DSVD capabilities.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system which has improved audio communication between a sound system comprised in the computer system and a removable PC Card coupled to the computer system, comprising:

a sound system comprised in the computer system, wherein said sound system includes at least one audio input for receiving an audio input signal and at least one audio output for providing an audio output signal;

a bus;

a PC Card bus adapter coupled to said bus;

a PC Card socket coupled to said PC Card bus adapter, wherein said PC Card socket is adapted for receiving one or more PC Cards, wherein said PC Card socket includes a plurality of pins;

a multiplexer coupled between one or more of said pins of said PC Card socket and said PC Card bus adapter, wherein said multiplexer is also coupled to said sound system, wherein said multiplexer selects either a first path between said one or more pins and said PC Card bus adapter or a second path between said one or more pins and said sound system; and a PC Card adapted for insertion in said PC Card socket, wherein when said PC Card is inserted into said PC Card socket, said multiplexer is operable to select said second path between said one or more pins of said PC Card socket and said sound system to provide digital audio communication between said PC Card and said sound system.

2. The computer system of claim 1, wherein said PC Card generates a digital audio output signal, wherein when said PC Card is inserted into said PC Card socket, and when said multiplexer selects said second path between said one or more pins and said sound system, said digital audio output signal generated by said PC Card is provided through said one or more pins of said PC Card socket to said audio input of said sound system.

3. The computer system of claim 2, wherein said sound system includes one or more speakers, wherein said one or more speakers in said sound system generate sound in response to said digital audio output signal generated by said PC Card provided through said one or more pins to said audio input of said sound system.

4. The computer system of claim 1, wherein said sound system generates a digital audio output signal, wherein when said PC Card is inserted into said PC Card socket, and when said multiplexer selects said second path between said one or more pins and said sound system, said digital audio output signal generated by said sound system is provided through said one or more pins of said PC Card socket to an input of said PC Card.

5. The computer system of claim 4, wherein said sound system includes:

a microphone for receiving analog audio signals;

a codec which receives said analog audio signals and generates corresponding digital audio signals.

6. The computer system of claim 1, wherein at power-up of said computer system said multiplexer is initially configured to select said first path between said one or more pins and said PC Card bus adapter.

7. The computer system of claim 1, further comprising:

means coupled to said multiplexer for selecting either said first path or said second path.

8. The computer system of claim 1, wherein said plurality of pins in said PC Card socket includes one or more high address pins defined for transmitting address signals;

wherein said multiplexer is coupled to said one or more high address pins of said PC Card socket, wherein said multiplexer selects either said first path between said one or more high address pins and said PC Card bus adapter or a second path between said one or more high address pins and said sound system;

wherein when said PC Card is inserted into said PC Card socket, said multiplexer is operable to select said second path between said one or more high address pins and said sound system to provide digital audio communication between said PC Card and said sound system.

9. The computer system of claim 1, wherein said plurality of pins comprised in said PC Card socket electrically conform to the Personal Computer Memory Card International Association (PCMCIA) specification; and wherein said PC Card electrically conforms to the Personal Computer Memory Card International Association (PCMCIA) specification.

10. The computer system of claim 1, wherein said PC Card comprises a modem with telephone answering device and speakerphone capabilities.

11. A computer system which has improved digital audio communication between a sound system comprised in the computer system and a removable PC Card coupled to the computer system, comprising:

a sound system comprised in the computer system, wherein said sound system includes a digital audio input for receiving a digital audio input signal, wherein said sound system generates a digital audio output signal;

a bus;

a PC Card bus adapter coupled to said bus;

a PC Card socket coupled to said PC Card bus adapter, wherein said PC Card socket is adapted for receiving one or more PC Cards, wherein said PC Card socket includes a plurality of pins connected to said PC Card bus adapter, wherein one or more of said pins are connected to said sound system; and a PC Card adapted for insertion in said PC Card socket, wherein said PC Card generates a digital audio output signal;

wherein when said PC Card is inserted into said PC Card socket, said digital audio output signal generated by said PC Card is provided through said one or more pins of said PC Card socket to said digital audio input of said sound system, and said digital audio output signal from said sound system is provided through said one or more pins of said PC Card socket to an input of said PC Card.

12. The computer system of claim 11, wherein said sound system includes:

a codec which receives said digital audio input signal and generates a corresponding analog signal;

one or more speakers coupled to said codec which receives said corresponding analog signal, wherein said one or more speakers generate sound in response to said corresponding analog signal generated by said codec.

13. The computer system of claim 11, wherein said plurality pins comprised in said PC Card socket electrically conform to the Personal Computer Memory Card International Association (PCMCIA) specification;

wherein said PC Card electrically conforms to the Personal Computer Memory Card International Association (PCMCIA) specification.

14. The computer system of claim 11, wherein said PC Card comprises a modem with speakerphone capabilities and telephone answering device capabilities.

15. A computer system which has improved digital audio communication between a sound system comprised in the computer system and a removable PC Card coupled to the computer system, comprising:

a sound system comprised in the computer system, wherein said sound system generates a digital audio output signal;

a bus;

a PC Card bus adapter coupled to said bus;

a PC Card socket coupled to said PC Card bus adapter, wherein said PC Card socket is adapted for receiving one or more PC Cards, wherein said PC Card socket includes a plurality of pins connected to said PC Card bus adapter, wherein one or more of said pins are connected to said sound system; and a PC Card adapted for insertion in said PC Card socket, wherein when said PC Card is inserted into said PC Card socket, said digital audio output signal generated by said sound system is provided through said one or more pins of said PC Card socket to a digital audio input of said PC Card.

16. The computer system of claim 15, wherein said sound system includes:

a microphone for receiving analog audio signals;

a codec which receives said analog audio signals received by said microphone and generates said digital audio output signals.

17. The computer system of claim 15, wherein said sound logic includes:

a microphone for receiving analog audio signals;

a codec which receives said analog audio signals received by said microphone and generates corresponding digital audio signals;

a multiplexer including a first input which receives said corresponding digital signals from said codec, wherein said multiplexer also includes a second input which receives a second audio output signal from said sound system;

wherein said multiplexer selects either a first path between said digital audio signals from said codec and said one or more pins of said PC Card socket or a second path between said second audio output signal from said sound system and said one or more pins of said PC Card socket.

18. The computer system of claim 17, wherein said PC Card comprises a modem with speakerphone capabilities, wherein said PC Card includes a connector for connecting through a communication path to a communications device, and wherein a user uses said computer system to connect with said communications device;

wherein said multiplexer selects said first path between said digital audio signals from said codec and said one or more pins of said PC Card socket to transmit voice data from said microphone to said communications device, and wherein said multiplexer selects said second path between said audio output signal from said sound logic and said one or more pins of said PC Card socket to transmit said second audio output signal from said sound system to said communications device.

19. The computer system of claim 15, wherein said plurality of pins comprised in said PC Card socket electrically conform to the Personal Computer Memory Card International Association (PCMCIA) specification;

wherein said PC Card electrically conforms to the Personal Computer Memory Card International Association (PCMCIA) specification.

20. The computer system of claim 15, wherein said PC Card generates a digital audio output signal, wherein when said PC Card is inserted into said PC Card socket, said digital audio output signal generated by said PC Card is provided through at least one of said one or more pins of said PC Card socket to said sound system.

21. The computer system of claim 20, wherein said PC Card comprises a modem with speakerphone capabilities and telephone answering device capabilities.

22. A computer system which has improved audio communication between a sound system comprised in the computer system and a removable PC Card coupled to the computer system, comprising:

a sound system comprised in the computer system, wherein said sound system generates a digital audio output signal;

a bus;

a PC Card bus adapter coupled to said bus;

a PC Card socket coupled to said PC Card bus adapter, wherein said PC Card socket is adapted for receiving one or more PC Cards, wherein said PC Card socket includes a plurality of pins, wherein said plurality of pins comprised in said PC Card socket electrically conform to the Personal Computer Memory Card International Association (PCMCIA) specification, wherein said plurality of pins include one or more pins connected to said sound system; and  a PC Card adapted for insertion in said PC Card socket, wherein said PC Card electrically conforms to the Personal Computer Memory Card International Association (PCMCIA) specification, wherein said PC Card generates a digital audio output signal;

wherein when said PC Card is inserted into said PC Card socket, said digital audio output signal generated by said PC Card is provided through at least one of said one or more pins of said PC Card socket to said sound system, and said digital audio output signal generated by said sound system is provided through at least one of said one or more pins of said PC Card socket to said PC Card.

23. The computer system of claim 22, wherein said sound system includes:

a codec for performing digital to analog conversions, wherein said codec receives said digital audio output signal generated by said PC Card and generates a corresponding analog signal;

one or more speakers coupled to said codec which receive said corresponding analog signal;

wherein said one or more speakers generate sound in response to said analog audio output signal generated by said PC Card.

24. The computer system of claim 22, wherein said sound logic includes:

a microphone for receiving analog audio signals;

a codec which receives said analog audio signals and generates corresponding digital audio signals.

25. The computer system of claim 22, wherein said one or more pins connected to said sound system include one or more high address pins.

26. The computer system of claim 22, wherein said PC Card comprises a modem with telephone answering device and speakerphone capabilities.

27. A computer system which has improved audio communication between a sound system comprised in the computer system and a removable PC Card coupled to the computer system, comprising:

a sound system comprised in the computer system;

a bus;

a PC Card bus adapter coupled to said bus;

a PC Card socket coupled to said PC Card bus adapter, wherein said PC Card socket is adapted for receiving one or more PC Cards, wherein said PC Card socket includes a plurality of pins, said plurality of pins including one or more high address pins defined for transmitting address signals;

a multiplexer coupled to said one or more high address pins in said PC Card socket, wherein said multiplexer is also coupled to said PC Card bus adapter and said sound system, wherein said multiplexer selects either a first path between said one or more high address pins and said PC Card bus adapter or a second path between said one or more high address pins and said sound system;

a PC Card adapted for insertion in said PC Card socket, wherein when said PC Card is inserted into said PC Card socket, said multiplexer can select said second path between said one or more high address pins and said sound system to provide digital audio communication between said PC Card and said sound system.

28. The computer system of claim 27, wherein said PC Card generates a digital audio output signal, wherein when said PC Card is inserted into said PC Card socket, and when said multiplexer selects said second path between said one or more high address pins and said sound system, said digital audio output signal generated by said PC Card is provided through said one or more high address pins of said PC Card socket to a digital audio input of said sound system.

29. The computer system of claim 27, wherein said sound system generates a digital audio output signal, wherein when said PC Card is inserted into said PC Card socket, and when said multiplexer selects said second path between said one or more high address pins and said sound system, said digital audio output signal generated by said sound system is provided through said one or more high address pins of said PC Card socket to an input of said PC Card.

30. The computer system of claim 27, wherein at power-up of said computer system said multiplexer is initially configured to select said first path between said one or more high address pins and said PC Card bus adapter.

31. A method for providing improved audio communication between a sound system comprised in a computer system and a removable PC Card coupled to the computer system, wherein said sound system includes one or more speakers, the method comprising:

connecting a PC Card to a PC Card socket in the computer system;

the PC Card generating a digital audio output signal;

providing the digital audio output signal generated by the PC Card through a pin of the PC Card socket to the sound system of the computer system, wherein said providing the digital audio output signal generated by the PC Card is performed in response to said PC Card generating said analog audio output signal;

the one or more speakers generating sound in response to said analog audio output signal generated by said PC Card;

the sound system generating a digital audio output signal;

providing the digital audio output signal generated by the sound system through a pin of the PC Card socket to the PC Card, wherein said providing the digital audio output signal generated by the sound system is performed in response to said sound system generating the digital audio output signal;

the PC Card transmitting the digital audio output signal generated by the sound system to an external communication path.

\* \* \* \* \*